(12) United States Patent
Shults et al.

(10) Patent No.: US 11,397,514 B2
(45) Date of Patent: *Jul. 26, 2022

(54) SYSTEMS AND METHODS FOR ROTATIONAL VIDEO-LIKE DISPLAY OF IMAGES OF A GEMSTONE IN A VIEWER HAVING A PAN FEATURE

(71) Applicant: Blue Nile, Inc., Seattle, WA (US)

(72) Inventors: Brandon Shults, Burien, WA (US); Gregory Katz, Seattle, WA (US)

(73) Assignee: BLUE NILE, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,013

(22) Filed: Jan. 4, 2021

(65) Prior Publication Data

US 2021/0141500 A1 May 13, 2021

Related U.S. Application Data

(63) Continuation of application No. 15/870,644, filed on Jan. 12, 2018, now Pat. No. 10,884,582.

(60) Provisional application No. 62/559,362, filed on Sep. 15, 2017.

(51) Int. Cl.
| | | |
|---|---|---|
| *G06F 3/0482* | (2013.01) | |
| *G06F 3/04845* | (2022.01) | |
| *G06Q 30/06* | (2012.01) | |
| *G06T 13/80* | (2011.01) | |
| *G06T 15/20* | (2011.01) | |
| *G06F 3/04817* | (2022.01) | |
| *G06F 16/951* | (2019.01) | |

(52) U.S. Cl.
CPC ........ *G06F 3/0482* (2013.01); *G06F 3/04845* (2013.01); *G06Q 30/0643* (2013.01); *G06T 13/80* (2013.01); *G06T 15/20* (2013.01); *G06F 3/04817* (2013.01); *G06F 16/951* (2019.01)

(58) Field of Classification Search
CPC .................................................. G06F 3/0482
See application file for complete search history.

(56) References Cited

U.S. PATENT DOCUMENTS

| | | | | |
|---|---|---|---|---|
| 9,865,069 | B1 * | 1/2018 | Saporta | ..................... G06T 3/40 |
| 2005/0198571 | A1 * | 9/2005 | Kramer | ................ H04N 13/161 |
| | | | | 715/236 |
| 2017/0228864 | A1 * | 8/2017 | Liu | ........................... G06T 7/80 |

* cited by examiner

*Primary Examiner* — Roland J Casillas
(74) *Attorney, Agent, or Firm* — Perkins Coie LLP

(57) ABSTRACT

System and method for rotational video-like display of images of a gemstone in a viewer having a pan feature. In response to a pan command specifying a direction of rotation for a displayed gemstone, a computing system receives multiple datasets of images of the gemstone. Each dataset contains multiple images of the gemstone, with each image captured from a different angular perspective as compared to other images in the dataset. The different perspective can be captured, for example, around an axis of rotation that depicts the item at a particular angle of view. Once multiple images are received in a dataset, the images are progressively displayed in a viewer by transitioning between individual images in a certain order based on the received pan command. The pan command can specify both a direction and a magnitude of rotation, such as by clicking and dragging or swiping on a touchscreen.

18 Claims, 8 Drawing Sheets

| Diamonds ˅ | Engagement Rings ˅ | Wedding ˅ | Jewelry & Gifts ˅ | Designers ˅ | Education ˅ |
|---|---|---|---|---|---|

Compare Your Diamonds (4)

| | 801 / 811 | 803 / 813 | 805 / 815 | 807 / 817 |
|---|---|---|---|---|
| Enlarge | 🔍 ≡ ↻ | 🔍 ≡ ↻ | 🔍 ≡ ↻ | 🔍 ≡ ↻ |
| View Details | LD08255412 | LD08265439 | LD07597108 | LD08255420 |
| Add to | Add to ˅ | Add to ˅ | Add to ˅ | Add to ˅ |
| Price | $5,398 | $5,278 | $5,243 | $5,146 |
| Carat Weight | 1.00 | 1.01 | 1.02 | 1.00 |
| Shape | RD | RD | RD | RD |
| Cut | Very Good | Very Good | Very Good | Very Good |
| Color | G | H | H | H |

SYSTEMS AND METHODS FOR ROTATIONAL VIDEO-LIKE DISPLAY OF IMAGES OF A GEMSTONE IN A VIEWER HAVING A PAN FEATURE

CROSS-REFERENCE TO RELATED APPLICATIONS

The present application is a continuation of U.S. patent application Ser. No. 15/870,644, entitled "SYSTEMS AND METHODS FOR PROGRESSIVELY DISPLAYING IMAGES IN A VIEWER TO CREATE A VIDEO-LIKE DISPLAY OF A ROTATING ITEM" and filed on Jan. 12, 2018 (U.S. Pat. No. 10,884,582), which claims the benefit of U.S. Provisional Application No. 62/559,362, entitled "SYSTEMS AND METHODS FOR PROGRESSIVELY DISPLAYING IMAGES IN A VIEWER TO CREATE A VIDEO-LIKE DISPLAY OF A ROTATING ITEM" and filed on Sep. 15, 2017, the disclosures of which are incorporated herein by reference in their entireties.

BACKGROUND

As mobile device users increasingly demand access to video on their devices, network limitations continue to impact the user experience for a number of reasons. One difficulty of viewing a video is the size of the video file and time that it takes to download. After a user requests to view a video on a webpage, for example, the video must be downloaded, in part or in whole, before the video can begin playing. Depending on the available bandwidth and download speed of the wireless network to which a device is connected, this delay can be significant. Performance problems are further compounded as users gravitate to high resolution videos. For high resolution videos, the download time is longer because of the corresponding increase in file size. Finally, as the number of mobile devices proliferate, and the number of devices attempting to access video on older generation networks increase, video performance for all users decreases. The result is a suboptimal viewing experience for users because of the limitations of wireless networks to convey the desired video data to user mobile devices in a timely fashion.

In addition to challenges in delivery to mobile devices, traditional video files also restrict the viewing behavior of the user. For example, while a user may be able to generally pause, fast-forward, or rewind a video file (e.g., an MP4-encoded file), there is no convenient way for a user to view the video in a frame-by-frame manner. Often, this is simply because of the encoding used to construct the video. Most video encoding methods are designed to achieve bandwidth efficiency by encoding only the changes between frames, rather than storing each of the frames themselves. When stored in this fashion, it is difficult for video players to easily generate frames in both a forward or backward sequence to allow a user to view each frame separately. Indeed, interactions like panning and framing are not built-in to the video standards implemented by the currently available browsers (e.g., Internet Explorer, Mozilla Firefox, etc.).

These challenges indicate a fundamental technological problem with the user experience regarding the display of videos, particularly on wireless mobile devices. More specifically, the technological process used to store and retrieve files, and then to process and display those files, is inefficient and results in a delay for the user. Because this problem specifically arises in the realm of computer networks, a solution rooted in computer technology to overcome these issues is needed.

BRIEF DESCRIPTION OF THE DRAWINGS

FIG. 3 is a representative user interface including a list of items and a system-generated viewer for displaying images of a selected item in a video-like display.

FIG. 6 is a representative user interface including a viewer for displaying images of an item and details of resources that are requested and downloaded over the network for display in the viewer.

FIG. 8 illustrates a user interface including multiple viewers.

DETAILED DESCRIPTION

Figure 1:
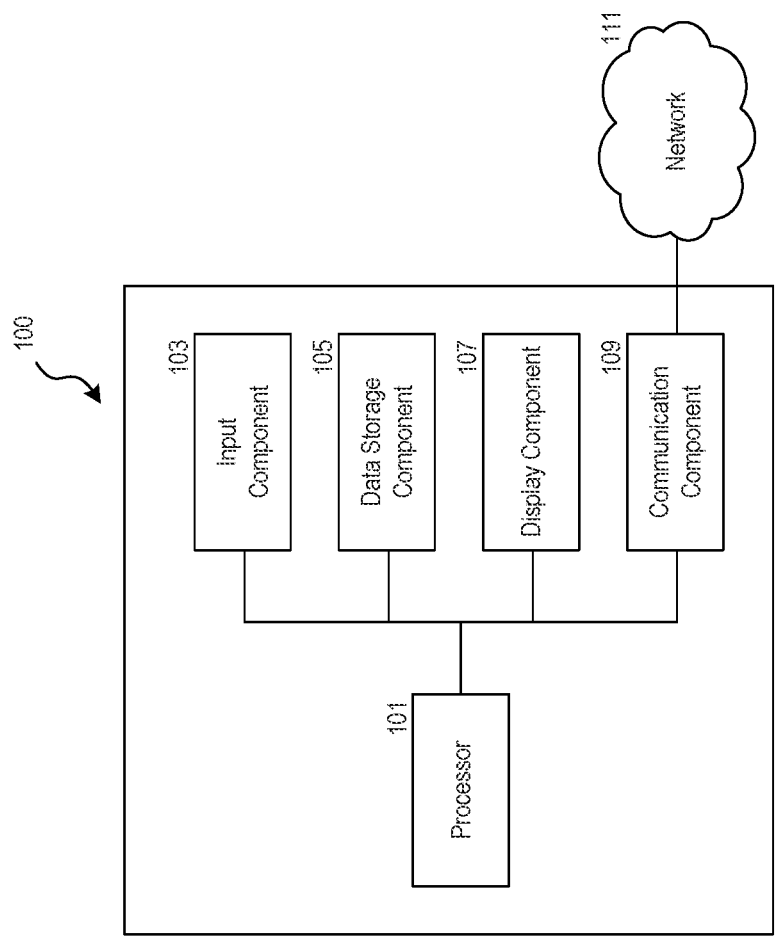
FIG. 1 is a schematic block diagram of a computing device in which a system for displaying images of an item to create a video-like display on a user interface may operate.

A system and method for progressively displaying images of an item to create a rotational video-like display are disclosed. The displayed images are contained within multiple datasets that are received by a computing device. Each received dataset contains multiple images of the same item, with each image captured of the item from a different perspective as compared to the other images in the dataset. The different perspective can be captured, for example, around an axis of rotation that reflects the item at a particular angle of view. Once multiple images are received in a dataset, the images can be progressively displayed to a user in a viewer by transitioning between individual images in a certain order so as to create the video-like display. The transitioning between individual images, including the speed of transition and selection of the next image to be displayed, can be controlled by the user. As additional datasets are received by the computing device, additional images are added to the rotating display of the item. As the images contained therein are added to the rotating display, the display become progressively smoother until the user is presented with a video-like display of the rotating item.

The rotational video-like display of an item, created by the sequential display of multiple images taken from different perspectives of the item, enhances the user experience. Because each of the plurality of datasets containing the images is relatively small compared to most video files, the images can be displayed on the user's device immediately after the first (i.e., initial) dataset is received. The user does not need to wait for a large video file to download, in whole or in part, before being able view the video-like display. Stated otherwise, instead of viewing a blank screen and waiting for video content to finish buffering, the user can view the rotational display of the item immediately after the first dataset is received.

Another feature of the present system is the ability to present a high resolution video-like display with minimal download time for the user. Unlike traditional systems which use a single video file and often need to sacrifice resolution to decrease the size and download time of the file, the present system breaks the single video file into multiple individual files that have much smaller file sizes. As such, even if each image for the present system is of the highest resolution, the file size of the individual file for that image is still relatively small compared to the traditional single video file and can be downloaded quicker. Furthermore, because the video-like display is composed of individual images, as opposed to a single video file, users can also pan (i.e., scrub, frame) in a clockwise and/or counter-clockwise direction to a desired perspective of the item. Stated otherwise, the user can provide a panning command directed to a desired direction or magnitude of rotation to view the item at a desired perspective.

Various embodiments of the invention will now be described. The following description provides specific details for a thorough understanding and enabling description of these embodiments. One skilled in the art will understand, however, that the present technology can be practiced without many of these details. Additionally, some well-known structures or functions are not shown or described in detail, so as to avoid unnecessarily obscuring the relevant description of the various embodiments.

The terminology used in the description presented below is intended to be interpreted in its broadest reasonable manner, even though it is used in conjunction with a detailed description of certain specific embodiments of the present technology. Certain terms may even be emphasized below; however, any terminology intended to be interpreted in any restricted manner will be overtly and specifically defined as such in this Detailed Description section.

Figure 2:
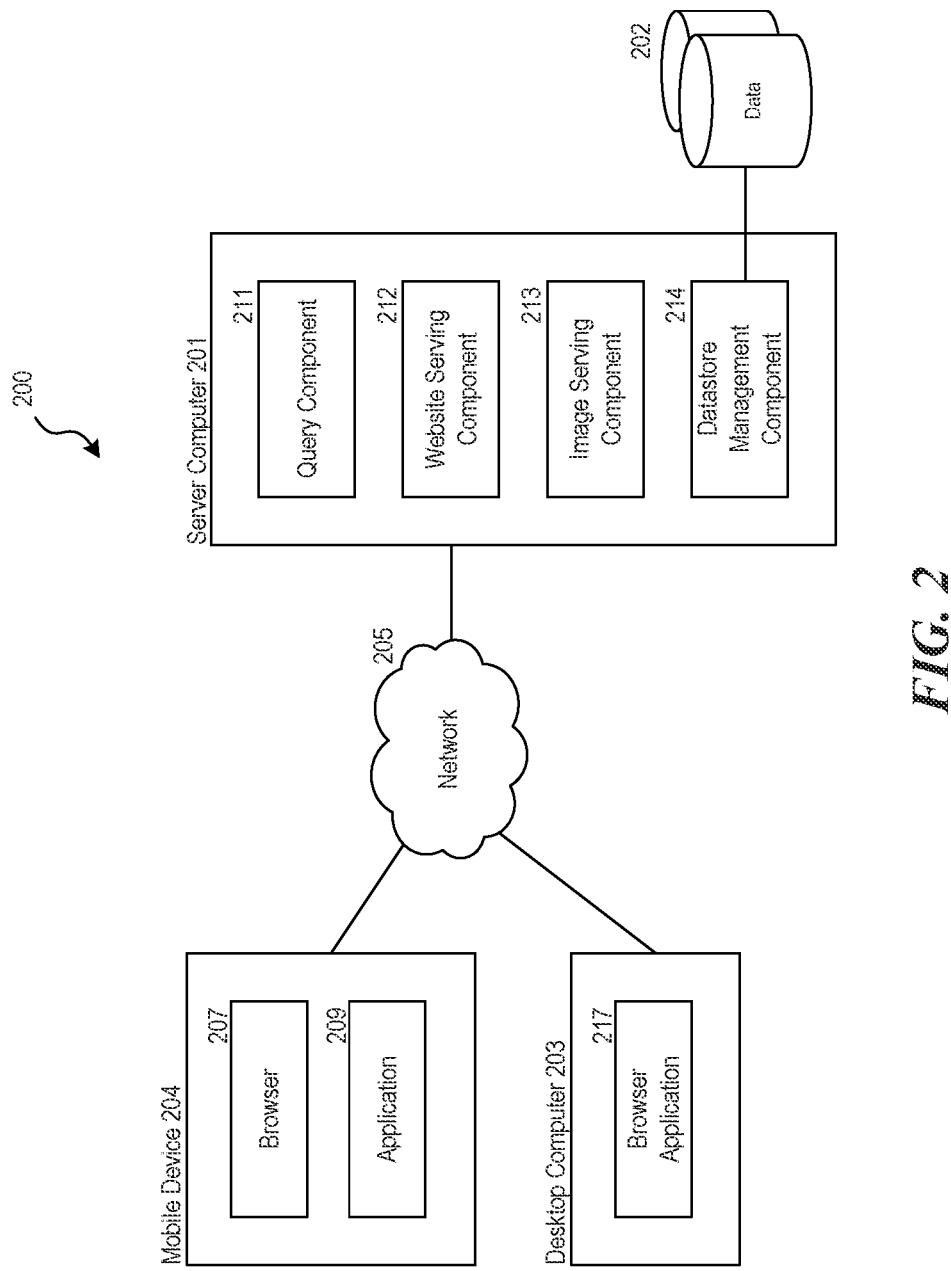
FIG. 2 is a schematic block diagram illustrating a suitable environment in which the disclosed system may be implemented.

FIGS. 1 and 2 and the following discussion provide a brief, general description of suitable computing environments in which aspects of the present technology can be implemented. Although not required, aspects and embodiments of the present technology will be described in the general context of computer-executable instructions, such as routines executed by a general-purpose computer, e.g., a server or personal computer. Those skilled in the relevant art will appreciate that the present technology can be practiced with other computer system configurations, including Internet appliances, hand-held devices, wearable computers, cellular or mobile phones, multi-processor systems, microprocessor-based or programmable consumer electronics, set-top boxes, mini-computers, mainframe computers, and the like. The present technology can be embodied in a special purpose computer or data processor that is specifically programmed, configured, or constructed to perform one or more of the computer-executable instructions explained in detail below. In some embodiments, the disclosed functionality may be implemented by instructions encoded in a non-transitory computer-readable storage medium.

The present technology can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the present technology described below can be stored or distributed on computer-readable media, including magnetic and optically readable and removable computer discs, stored as firmware in chips (e.g., Electrically-Erasable Programmable Read-Only Memory chips, EEPROM chips), as well as distributed electronically over the Internet or over other networks (including wireless networks). Those skilled in the relevant art will recognize that portions of the present technology can reside on a server computer, while corresponding portions reside on a mobile device. Data structures and transmission of data particular to aspects of the present technology are also encompassed within the scope of the present technology.

FIG. 1 is a schematic block diagram illustrating components of a computing device 100, such as a desktop computer, smartphone, tablet computer, phablet, laptop, wearable computer, etc., in which the interface for generating a video-like view of a rotating item may be generated. As shown in FIG. 1, the computing device 100 includes a processor 101, an input component 103, a data storage component 105, a display component 107, and a communication component 109. The processor 101 is configured to couple with and control other components in the computing device 100. The computing device 100 can communicate with other systems (e.g., Web servers or other devices) through the communication component 109 via a network 111. In some embodiments, the computing device 100 can communicate with an output device (e.g., printers, speakers, tactile output devices, etc.) through the communication component 109. Network 111 can be any private or public network, such as the Internet, a corporate intranet, a wireless communication network, or a wired communication network.

The input component 103 is configured to receive an input (e.g., an instruction or a command) from a device user. The input component 103 can include a keyboard, a mouse, a touch pad, a touchscreen, a microphone, a joystick, a pen, a game pad, a scanner, a camera, and/or the like. The data storage component 105 can include any type of computer-readable media that can store data accessible to the processor 101. In some embodiments, the data storage component 105 can include random-access memories (RAMs), read-only memories (ROMs), flash memory cards, magnetic hard drives, optical disc drives, digital video discs (DVDs), cartridges, smart cards, etc.

The display component 107 is configured to display information to the mobile device user. In some embodiments, the display component 107 can include flat panel displays such as liquid crystal displays (LCDs), light emission diode (LED) displays, plasma display panels (PDPs), electro-luminescence displays (ELDs), vacuum fluorescence displays (VPDs), field emission displays (FEDs), organic light emission diode (OLED) displays, surface conduction electron emitter displays (SEDs), or carbon nano-tube (CNT) displays.

FIG. 2 is a schematic block diagram of an environment 200 in which the system for generating an interface for displaying images of an item to create a rotational video-like display may operate. The environment 200 can include one or more server computers 201 that access data stores 202 containing information on a plurality of unique items. The server computers 201 communicate with computing devices 100 via a network 205. The computing devices 100 may send search queries to the server computers 201 pertaining to the unique items. The search queries are processed by the server computers 201 against the data in the data stores 202. The server computers 201 may retrieve, analyze, and/or format (e.g., in datasets) unique item information that is responsive to the received search queries. The server computer 201 transmits data responsive to the search queries to a requesting computing device 100 through the network 205.

The network 205 can include the Internet, an intranet, a wireless communication, or a wired communication.

The server computer 201 includes a query processing component 211, a website management component 212, an image serving component 213, and a database management component 214. The query component 211 is configured to perform query processing and analysis. The website management component 212 is configured to handle creation, display and/or routing of suitable information in the form of web pages. The image serving component 213 is configured to serve sets of images as described herein in a manner that generates a video-like display of an item. The image serving component 213 may be separate from, or incorporated within, the website management component 212. The database management component 214 is configured to manage access to and maintenance of data stores 202. The server computer 201 can employ security measures (e.g., firewall systems, secure socket layers (SSL), password protection schemes, encryption, and/or the like) to inhibit malicious attacks and to preserve integrity of the information stored in the data stores 202.

The computing device 100 may include one or more programs that submit queries to the server computers and receive responsive results. For example, a browser application 207 on a mobile device 204 is configured to access and exchange data with the server computer 201 through the network 205. Results of data queries may be displayed in a browser (e.g., Firefox, Chrome, Internet Explorer, Safari, etc.) of the mobile device 204 for viewing by the device user. Similarly, a browser application 217 on a desktop computer 203 is configured to access and exchange data with the server computer 201 through the network 205, and the results of the data queries may be displayed in the browser for review by the device user. As another example, a dedicated application 209 on the mobile device 204 is configured to display or present received information to a mobile device user via the application. Data may be received from the server computer 201 via an application programming interface (API), and the received data formatted for display by the application on the computing device 100. The server computer 201 and the computing device 100 can include other programs or modules such as an operating system, one or more productivity application programs (e.g., word processing or spread sheet applications), and the like.

Figure 3:
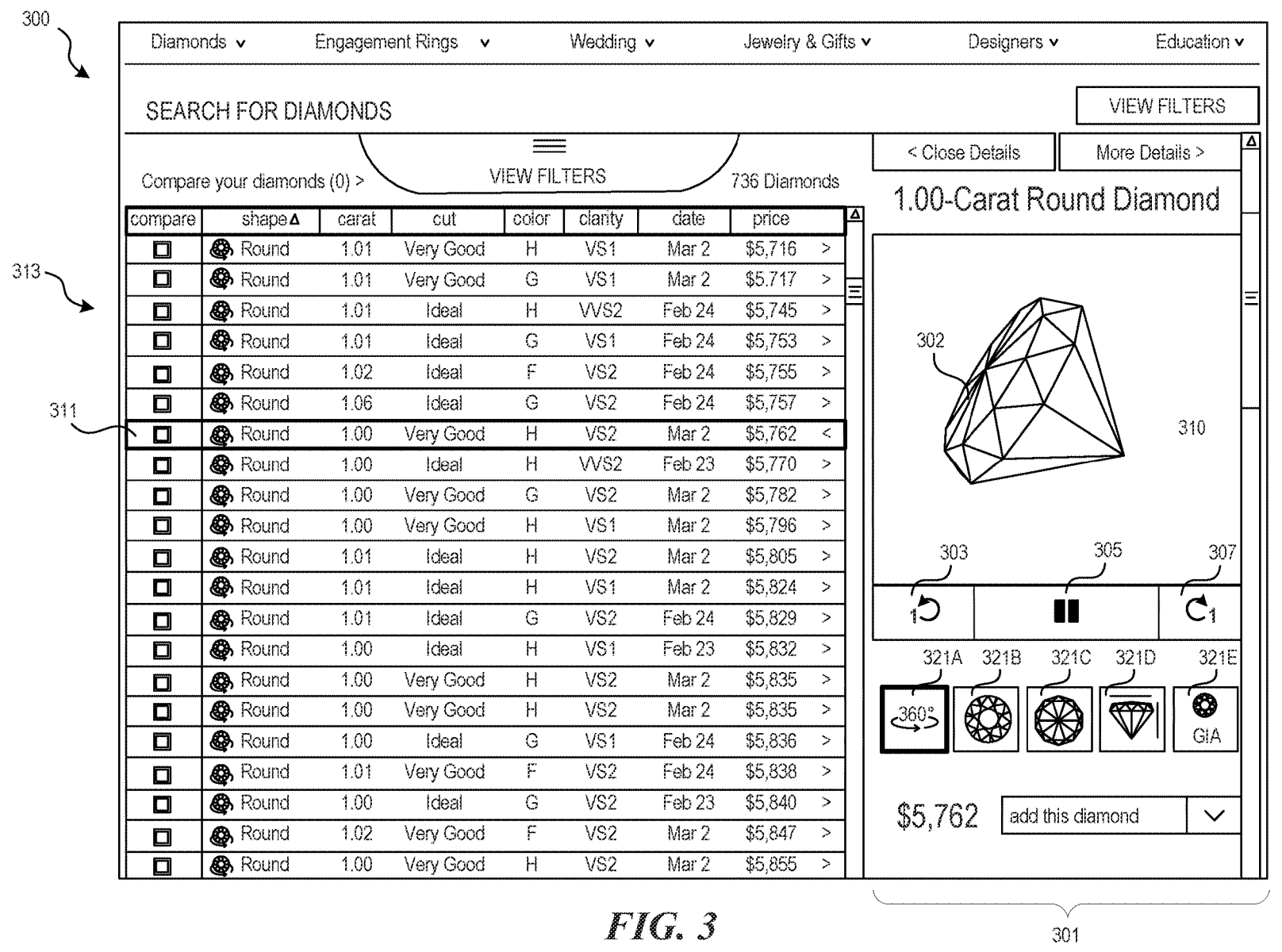

FIG. 3 is a screenshot of a representative user interface 300 that includes a list of items and a system-generated viewer for displaying images of a selected item in a video-like display. The particular user interface shown in FIG. 3 is directed to an interface that allows a user to search for particular gemstones for purchase. The interface 300 includes a list of gemstones 313 and a viewer 301 for displaying images of a selected gemstone, such as a gemstone 302 that corresponds to a descriptive row 311 in the list of gemstones 313. The list of gemstones 313 is displayed in tabular form and includes different attributes used to describe gemstones generally. Each row of the gemstone list 313 includes attributes such as shape, carat, cut, color, clarity, price, etc. of the corresponding gemstone. The list of displayed gemstones may result from, for example, a search by a user of gemstones having desired characteristics. The displayed gemstones can be filtered according to any of the attributes to help a user find a desired gemstone.

After selecting a particular gemstone in the list of gemstones 313, a user is presented with a variety of options to view the selected gemstone 302 in a viewing window 310 of the viewer 301. Five control buttons 321A-321E control the type of display that is presented in the viewer 301. By selecting button 321A, the system presents the gemstone 302 as a 360 degree video-like display in the viewing window 310. By selecting button 321B, the system presents a top view image of the gemstone in viewing window 310, meaning a single image taken from above the gemstone. By selecting buttons 321C or 321D, the system presents a top view diagram or a side view diagram, respectively, in the viewing window 310. Top view or side view diagrams are diagrammatic figures of the gemstone depicting, for example, the shape or the location of imperfections within the gemstone. Finally, by selecting button 321E, the gemstone image or diagram is replaced in the viewing window 310 with the GIA specification 329 of the gemstone. By selecting different control buttons, the user is thereby able to quickly switch between desired views or information about the same gemstone.

When the 360 degree video-like display of the gemstone is selected by a user, additional controls are displayed in the viewer 301 to provide the user with further control over the displayed images. In particular, the viewer 301 includes a pan forward button 307, a pan backward button 303 and a pause/play button 305. When first presented to the user, the gemstone 302 is depicted by the system as rotating about a vertical axis of the gemstone in the viewing window 310 so that all sides of the gemstone are presented to a user. By selecting the pause/play button 305, the user can stop the rotation of the gemstone. The user can manually control the rotation of the gemstone in a fine-grained manner using the pan forward button 307 and pan backward button 303. A user can manually select the pan forward button 307 to change the display of the gemstone 302 from a first image with a first perspective to a second image with a second perspective. The pan forward button 307 causes a rotation of the gemstone 302 in the viewing window in a first rotational direction, such as in a clockwise direction, by causing sequential images of the gemstone that have been captured from a perspective of one to 360 degrees to be displayed. The pan backward button 303 has similar functionality to the pan forward button 307, in that the pan backward button 303 changes the display of gemstone 302 from a first image with a first perspective to a second image with a second proximate perspective. The pan backward button 303, however, causes a rotation of the gemstone 302 in the viewing window in a second rotational direction, such as in a counter-clockwise direction, by causing sequential images of the gemstone that have been captured from a perspective of 360 to one degrees to be displayed.

The forward and backward panning of the displayed image can also be executed by selecting any point within the display area 310 and dragging the selection in a substantially horizontal direction. For example, a user can click and hold a cursor (e.g., controlled by a mouse) within the display area 310, and move the cursor towards the left side of the display area 310 to transition the displayed image in a clockwise direction to a desired perspective of the gemstone 302. Similarly, the user can move the cursor towards the right side of the display area 310 to transition the displayed image in a counter-clockwise direction to a desired perspective of the gemstone 302. Alternatively, on a device with touchscreen capability, the user can perform these same panning actions by contacting the touchscreen at a first point and dragging left or right to a second point. In any of these embodiments, the device receives a panning command directed to a desired direction of rotation and a magnitude of rotation. Notably, the operation of the viewer's functional features does not affect its ability to perform other tasks. For example, as explained below, the computing device can simultaneously receive additional datasets including images at different perspectives and continue updating the display while a user is panning.

As previously noted, a user can manually select the pause button 305 to pause the rotation of the selected gemstone 302 in the video-like display. The pause button 305 freezes the display in the viewing window at a single image. When a display is paused, the icon on the pause button 305 changes to a play button, which can be selected to re-initiate progressively displaying images in the video-like display. In some embodiments, a user can also pause the video-like display by selecting either of the pan forward 307 or pan backward 303 buttons.

Figure 4:
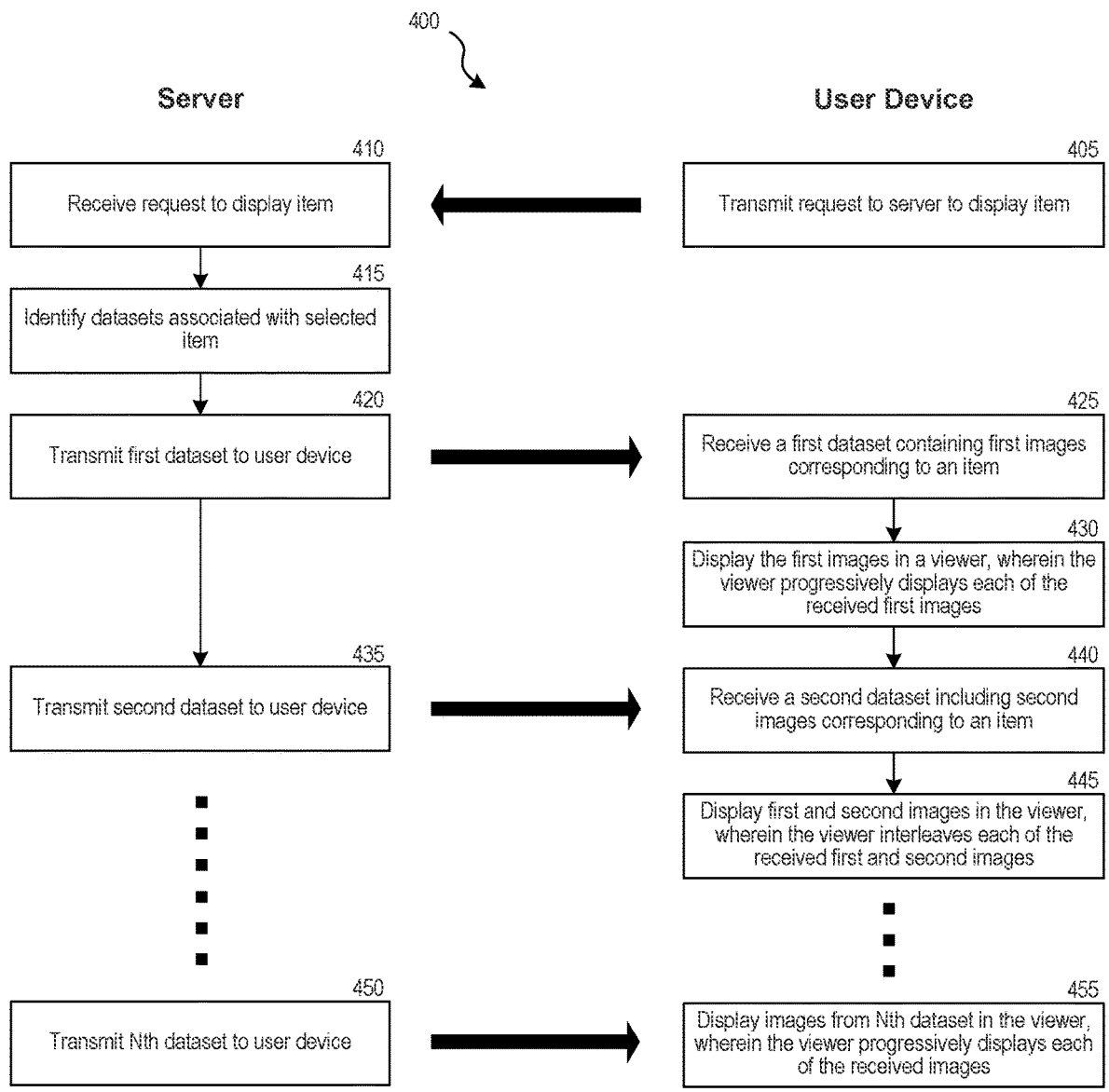
FIG. 4 is a flowchart of a method for displaying images of an item to create a video-like display on a user interface.

FIG. 4 is a flowchart illustrating a method 400 for displaying images of an item to create a video-like display on a user interface. Although the depicted method shows communication between a user device and a server, depending on various needs, the method 400 can be implemented by any suitable system (e.g., the computing device 100 or the server computer 201 discussed above) to generate the video-like display. The method 400 starts at block 405, in which a user device transmits a request to receive a video-like display related to a particular item, such as a gemstone, ring, or piece of jewelry. The item may be identified by a user using one or more traditional item discovery techniques, such as search, browse, recommendations, or the like, or may be selected by the user device. At block 410, the server receives the request to generate the video-like display. At block 415, the server identifies a set of datasets which depict the selected item from different perspectives. The different perspectives can be captured, for example, around an axis of rotation that reflects the item at a particular angle of view. As will be described in additional detail herein, the datasets are sequentially transmitted to the user device to allow the user device to begin to display the item in a video-like display prior to receiving all of the datasets.

At block 420, the server transmits the first dataset associated with the selected item to the user device. The images in the first dataset represent the item at different perspectives around an axis of rotation compared to each of the other first images. For example, the first dataset may include images of the item at perspectives of 90 degrees, 180 degrees, 270 degrees and 360 degrees. When displayed to a user, the different perspectives allow the user to view the item from different viewpoints to get a more comprehensive view of the item. As such, the different perspectives aid the user to better assess the item, such as by being able to better view particular inclusions and/or imperfections that may be present in a gemstone. In some embodiments, the images are not contained in the dataset, but rather are sent as individual images. In such embodiments, the images are individually received by the user device.

At block 425, the user device receives the first dataset containing images of the item. Receiving the first dataset can comprise downloading the first dataset to, for example, the data storage component on the user computing device. In some embodiments, receiving a dataset allows images contained in the dataset to be incorporated in a display queue of the viewer.

At block 430, the user device progressively displays the first images in a viewer, such as the viewer 301 described with respect to FIG. 3. The viewer displays the received first images one at a time and transitions between the images to create the video-like display. The viewer can display the first images in a particular order depending on the desired rotation of the item on the screen (e.g., clockwise or counter-clockwise rotation). For example, if the first dataset includes four first images at perspectives of 90 degrees, 180 degrees, 270 degrees and 360 degrees, the viewer can display the first images so that the item rotates in a clockwise direction by displaying, in order, the 90 degree image, the 180 degree image, the 270 degree image and the 360 degree image. Alternatively, the viewer can also display the first images so that the item rotates in a counter-clockwise direction by displaying, in order, the 360 degree image, the 270 degree image, the 180 degree image and the 90 degree image. Display of the first images in the viewer is continuously repeated until an action is taken by the user. When only the first dataset is being displayed to a user, the video-like display may appear jerky, as only a limited number of images having different perspectives of the item have been received and the perspective between each image may differ from the next image by a large number of degrees (e.g., a transition from a 90 degree image of an item to an 180 degree image). As additional images are received and incorporated into the display queue of the viewer, the transition between degrees for each of the images decreases and the display becomes smoother. While four images (at 90, 180, 270, and 360 degrees) are described in this example, it will be appreciated that the first dataset may have more or less images. Typically, the images will be equally spaced (as measured by perspective) and therefore received in groups that are equal devisors of 360 degrees. For example, 6 images may be received (at 60, 120, 180, 240, 300, and 360 degree perspectives) or 8 images may be received (at 45, 90, 135, 180, 225, 270, 315, and 360 degrees).

At block 435, the server transmits a second dataset to the user device. The images in the second dataset represent the item at different perspectives around an axis of rotation compared to each of the other images in the dataset. Moreover, the images in the second dataset are interleaved in perspective from the images transmitted in the first dataset. For example, if first dataset includes images of the item at perspectives of 90, 180, 270 and 360 degrees, the second dataset would include images of the item taken at perspectives of 45, 135, 215, and 315 degrees.

At block 440, the user device receives the second dataset which includes second images corresponding to the item. Each of the second images represents the item at a different perspective compared to the first images from the first dataset and also from the other second images in the second dataset. Receiving the second dataset can comprise downloading the second dataset to the same storage location as the first dataset previously downloaded. As such, images from the second dataset can be incorporated into the display queue of the viewer. The second dataset can be received simultaneously with the first dataset, or any time after the first dataset is received. Because the first dataset is already displayed to the user, the user is able to view and interact with the displayed item prior to the images from the second dataset being displayed.

At block 445, the user device displays the first and second images in the viewer. The viewer progressively displays each of the received first and second images in a particular order depending on the desired rotation (e.g., clockwise or counter-clockwise) of the item. The viewer can immediately display any dataset once it has been received, allowing, for example, the first dataset to be displayed prior to receipt of the second dataset. Display of the first and second images in the viewer can be continuously repeated to give the impression of the item continuing to rotate in the viewer.

After transmitting the first and second datasets, the server continues to transmit dataset to the user device until all datasets containing images of the item have been delivered.

The datasets may be transmitted without confirmation of receipt by the user device, or the user device may signal when a dataset has been received without error and request the delivery of the next dataset. At block 450, the server transmits an Nth dataset (e.g., 3rd, 4th, 5th, etc.) to the user device. The images in the Nth dataset represent the item at different perspectives around the axis of rotation compared to each of the other images in the dataset. Moreover, the images in the Nth dataset are interleaved in perspective from the images transmitted in the prior datasets. Because the images are intended to be interleaved with the prior images that have been transmitted to the user device, the number of images in each dataset may increase with each successive dataset. Using the prior example, if four images are each transmitted in the first and second dataset, the third dataset may contain eight images (each taken at a perspective interleaved between the eight images already delivered in in the first and second datasets). As a result, each successive dataset may increase in transmission size.

At a block 455, the user device displays the Nth received dataset in the viewer. The viewer progressively displays each of the received images in a particular order depending on the desired rotation (e.g., clockwise or counter-clockwise) of the item. As additional datasets are received by the user device, the display of the rotating item continues to increase in quality until the item appears to be seamlessly rotating in a video-like manner.

The depicted method 400 shown in FIG. 4 represents just one embodiment of how a user device can communicate with a server in accordance with the present technology. In other embodiments, the operations of method 400 can be altered while still maintaining a similar functionality. For example, instead of transmitting only a single data set at a time from the server to the user device (e.g., blocks 420, 435, 450), the server can send all of the datasets at once (e.g., at block 420). In such an embodiment, the user device would then sort and display the different datasets and images in the correct order. As another example, instead of transmitting just a single request to the server (e.g., block 405), the user device can transmit multiple requests in series. In such an embodiment, each request for a subsequent dataset may be transmitted by the user device only after the previous dataset is received and/or displayed by the user device.

Figure 5:
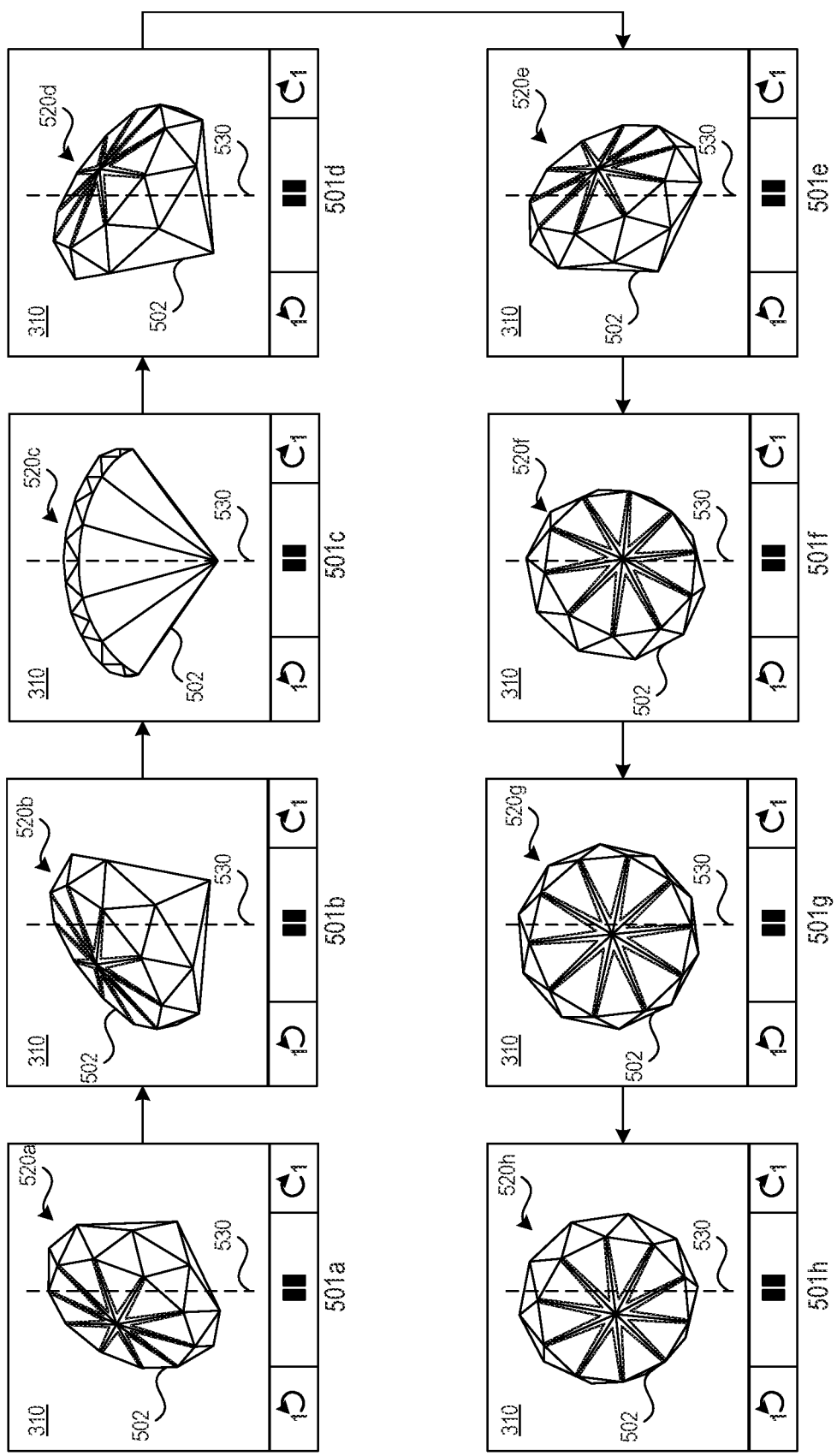
FIG. 5 is an illustration of a viewer displaying different perspectives of an item.

FIG. 5 is an illustration of screenshots 501a-501h of the viewer window 310 and associated controls captured at different times to depict the rotation of a displayed gemstone 502. The screenshots 501a-501h depict images of a gemstone 502 at different perspectives 520a-h relative to an axis of rotation 530. As shown in FIG. 5, the axis of rotation 530 is along a vertical axis. In other embodiments, the axis of rotation 530 can be along a horizontal axis or along an offset axis. The axis of rotation 530, around which the perspective of each image is based, can be along any portion of the gemstone 502, including the base, middle, or tip. As shown in FIG. 5, for example, the axis of rotation 530 is along a middle portion of the gemstone 502. In contrast, in FIG. 7, the axis of rotation is along the base of the gemstone.

The screenshots 501a-501h collectively show the gemstone 502 rotating around the axis of rotation 530 in a clockwise direction. Screenshot 501a shows an image of the gemstone 502 at a first perspective 520a, screenshot 501b shows an image of the gemstone 502 at a second perspective 520b, screenshot 501c shows an image of the gemstone 502 at a third perspective 520c, screenshot 501d shows an image of the gemstone 502 at a fourth perspective 520d, screenshot 501e shows an image of the gemstone 502 at a fifth perspective 520e, screenshot 501f shows an image of the gemstone 502 at a sixth perspective 520f, screenshot 501g shows an image of the gemstone 502 at a seventh perspective 520g, and screenshot 501h shows an image of the gemstone 502 at an eighth perspective 520h. The sequential display and transition between the images of the gemstone 502 create a video-like rotational display for the user to view.

Figure 6:
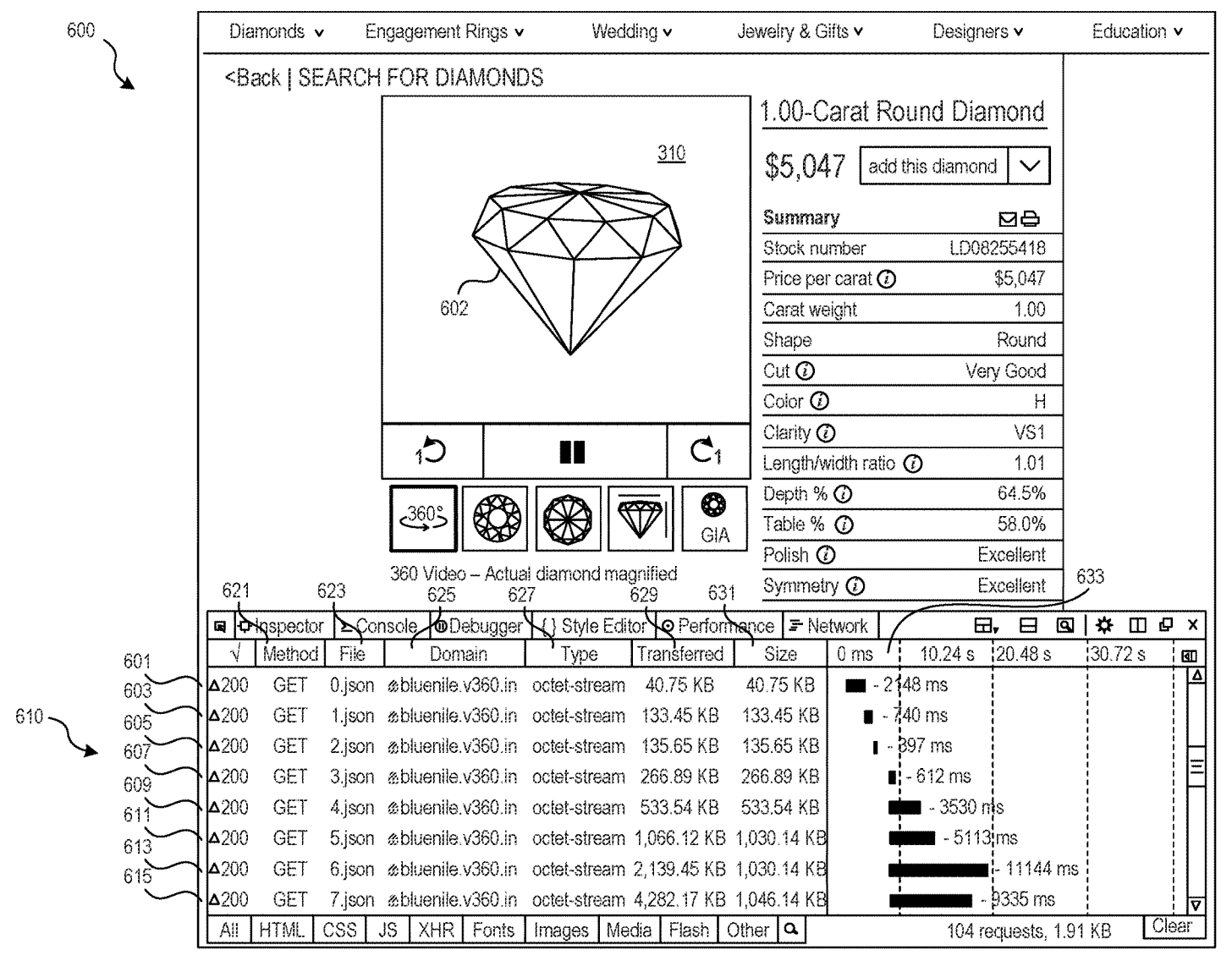

FIG. 6 is a screenshot of a user interface 600 including the viewer window 310 and a tools window 610 for displaying details of resources that are requested and downloaded over a network connecting the server and the user device. The tools window 610 depicts information for each network operation related to a delivered webpage to the user device, such as timing and characteristics of delivered files. The tools window 610 shown in FIG. 6 includes eight different files (respectively, files 601, 603, 605, 607, 609, 611, 613, 615) that have been received by the user's computing device. Details of each file can include, for example, files names, timing data, file sequencing, etc. More specifically, the tools window 610 depicted in FIG. 6 includes the request method 621 (e.g., GET, POST, etc.), the name of the file being received 623 (e.g., 1.json, 2.json, etc.), the domain from which the file was received 625 (e.g., bluenile.v360.in, www.bluenile.com, etc.), the type of file being received 627 (e.g., octet-stream, html, gif, css, png, jpeg, etc.), the amount of file data transferred from the domain to the computing device 629 (expressed, for example, in kilobytes), the size of the file 631 (e.g., kilobytes), and the time to download a file 633 (e.g., in milliseconds). The tools window 610 also contains a timing diagram 633, which visually depicts when each file was received by the user device and the relative length of that reception. For example, as shown in the timing diagram 633 of FIG. 6, the 0.json file took 2148 ms to download, before the download of the 1.json file began. The 1.json file took 740 ms to download, before the 2.json file download started. After the first three files are received (0.json, 1.json, 2.json), the remaining files are downloaded in parallel. Although downloaded in parallel, certain files (e.g., 4.json) are downloaded more quickly in their entirety than other files (e.g., 6.json).

One benefit of the disclosed system and method is that each dataset and the images included therein can be displayed to the user as soon as the corresponding dataset is received, without waiting for subsequent datasets. Instead of requiring the user to wait for an entire video file to be downloaded, or alternatively an entire file including a plurality of images that represent a video-like display to be downloaded, the images that comprise the final video-like display in the present application are separated into different, smaller datasets, thereby facilitating quicker downloads and use. That is, by separating the images into a plurality of individual datasets, the initial images can be displayed to a user and allow the user to view an initial video-like display soon after requesting a page and before receipt of all image data. As subsequent datasets are received, the display will continually improve from what may initially be a jerky display to a smooth video-like display.

The disclosed method and system can be explained in further detail with specific regard to gemstones and the user interface 600. As illustrated in the embodiment shown in FIG. 6, eight files 601, 603, 605, 607, 609, 611, 613, 615 are shown as being downloaded by a browser application. In the depicted example, each of the files is a JAVASCRIPT Object Notation (JSON) object file. The files 601, 603, 605, 607, 609, 611, 613, 615 are listed in order of the time that each file begins to be received. For example, the download of 1.json is started before the download of 2.json, which is started before 3.json, which is started before 4.json, etc. Each file may begin to be downloaded while the previous file is still downloading or after the previous file is completely downloaded. For example, 2.json may begin to be downloaded any time after 1.json begins downloading. Each .json file includes a dataset having a plurality of objects, and each plurality of objects includes images that correspond to different perspectives of an item (e.g., a gemstone). For example, 1.json may include four images of a gemstone taken at perspectives of 90, 180, 270 and 360 degrees. Once the 1.json dataset has been downloaded, the images contained in the dataset can be immediately displayed to the user in the viewer 301. As previously described, the images are progressively displayed in the viewer 301, such that the viewer displays an image and then transitions in order to a subsequent image having a perspective that is proximate to the previously-displayed image. As such, the viewer 301 would display, for example, the image of the gemstone taken at a perspective of 90 degrees and transition, in order, to the images of the gemstone corresponding to 180 degrees, 270 degrees, and 360 degrees. At or after the time that the 1.json dataset begins to be downloaded, the 2.json can begin to download. The 2.json dataset includes images at different perspectives from the 1.json dataset. For example, 2.json may include four images of the gemstone taken at perspectives of 135, 225, 315 and 45 degrees. In some embodiments, the perspectives of each subsequent dataset can be equally spaced between perspectives of images from previously received datasets. In other embodiments, the perspectives of subsequent datasets can be random. The 2.json dataset is downloaded and the images contained therein are immediately displayed to the user in the viewer 301 along with the images from the 1.json dataset, which are already being displayed. As such, the images from 2.json are incorporated into a display queue of the viewer as they are received. The viewer 301 continues to progressively display the downloaded images by displaying an individual image and transitioning in an order to a subsequent image having a perspective that is most proximate to the previously displayed image. For example, in this particular embodiment, if the viewer displays the image with a perspective of 180 degrees, the next image displayed could be the image with a perspective of 225 degrees or 135 degrees. At or after the time that the 2.json dataset begins to be downloaded, the 3.json dataset can begin to download. The 3.json dataset may include eight images at different perspectives from images contained in the 1.json and 2.json datasets. For example, the 3.json dataset may include images at perspectives of 112.5, 157.5, 202.5, 247.5, 292.5, 337.5, 22.5 and 67.5 degrees. The downloading process continues until all of the datasets (e.g., 4.json, 5.json, 6.json, 7.json) and images included therein are downloaded. In some embodiments, the 4.json dataset can include 16 images, the 5.json dataset can include 32 images, the 6.json dataset can include 64 images, and the 7.json dataset can include 128 images. In such an embodiment, 256 total images are received of the gemstone 602 around a 360 degree scale to create the rotational video-like display of the gemstone. In some embodiments, the speed of rotation of the displayed gemstone, measured as the time needed to progressively display all 256 received images, is about eight seconds, and the download time for all 256 images is about six seconds.

The parameters associated with receiving and displaying of item images can vary in order to optimize the display for a desired application. Stated otherwise, a retailer displaying its product with the viewer described above may desire a greater number of images to be delivered in initial datasets, thereby improving the quality of the initial display of the item but leading to a slower initial display time. As such, the retailer may design its viewer with different parameters and/or factors than those described above. For example, a different number of datasets (e.g., 10, 20, 30, etc.), images per file (e.g., 5, 10, 15, 20, etc.), and total images (e.g., 512, 1024, etc.) than that described in the above embodiments may be used to provide a different user interface experience according to a particular application. Similarly, the method by which datasets are received may also vary. For example, instead of receiving only a single dataset per request, a request to receive multiple datasets may be made. Other factors associated with the viewer (e.g., the speed of transition between images, total download time, etc.) can also be varied based on desired needs.

Figure 7:
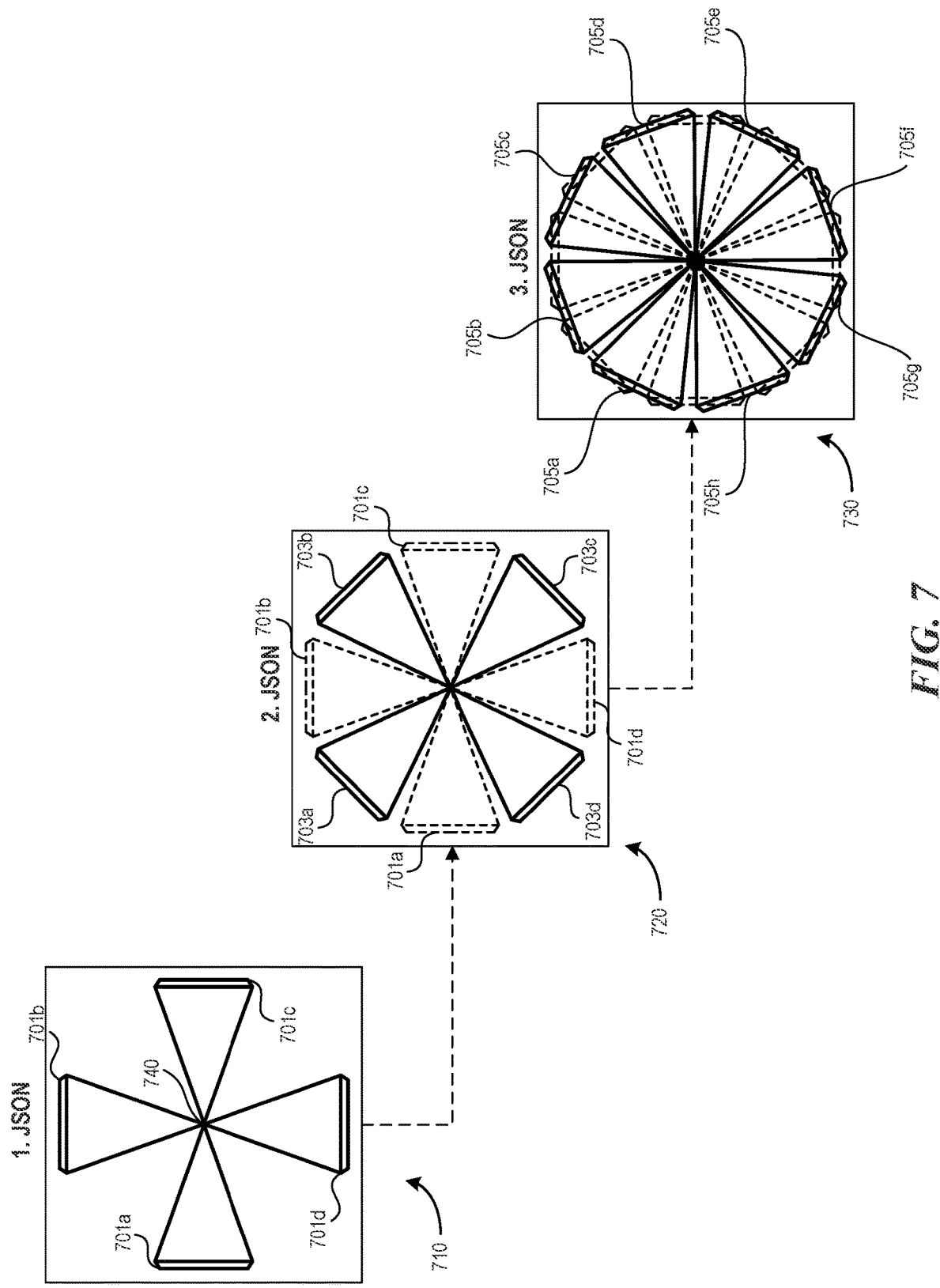
FIG. 7 illustrates downloaded datasets that contain images of different perspectives of an item.

FIG. 7 conceptually illustrates datasets that include sets of images reflecting different perspectives of an item. Each block 710, 720, 730 represents a JSON dataset (e.g., 1.json, 2.json and 3.json) that is transmitted for display on the viewer 401. Each dataset contains multiple images 701*a-d*, 703*a-d*, 705*a-h* taken of an item that is located at an axis of rotation 740 at the center of each block 710, 720, and 730. Each image is taken of the object from a different perspective of the object, as measured on a 360 degree scale. Block 710, for example, represents the 1.json dataset and includes four images 701*a-d*. Image 701*a* is captured at a perspective of 90 degrees to the item, image 701*b* is at a perspective of 180 degrees, image 701*c* is at a perspective of 270 degrees, and image 701*d* is at a perspective of 360 degrees. Each image 701*a-d* of the 1.json dataset is equally spaced around the 360 degree scale. Block 720 represents the 2.json dataset and includes four images 703*a-d*. Image 703*a* is captured at a perspective of 135 degrees to the item, image 703*b* is at a perspective of 225 degrees, image 703*c* is at a perspective of 315 degrees, and image 703*d* is at a perspective of 45 degrees. Each image 703*a-d* of the 2.json dataset is equally spaced around the 360 degree scale and located between images 701*a-d* of the 1.json dataset. Block 730 represents the 3.json dataset and includes eight images 705*a-h*. Image 705*a* is captured at a perspective of 112.5 degrees to the item, image 705*b* is at a perspective of 157.5 degrees, image 705*c* is at a perspective of 202.5 degrees, image 705*d* is at a perspective of 247.5 degrees, image 705*e* is at a perspective of 292.5 degrees, image 705*f* is at a perspective of 337.5 degrees, image 705*g* is at a perspective of 22.5 degrees, and image 705*h* is at a perspective of 67.5 degrees. Each image 705*a-h* of the 3.json dataset is equally spaced around the 360 degree scale and located between images 701*a-d* of the 1.json dataset and images 703*a-d* of the 2.json dataset. Additional datasets (e.g., 4.json, 5.json, 6.json, 7.json, etc.) could be represented by similar blocks with images placed around the axis of rotation 740 according to the perspective of each image.

FIG. 8 is a screenshot of a representative user interface that includes multiple viewers. The user interface 800 includes four viewers 801, 803, 805, 807, each of which can include a different gemstone 811, 813, 815, 817. The user interface 800 can therefore be used to compare different gemstones. Each viewer 801, 803, 805, 807 can progressively display images of the different gemstone to create a rotational video-like display, as described above. Each viewer also has the functionality as described above with respect to FIG. 3. A user can, for example, pause, pan forward and/or pan backward each of the individual viewers 801, 803, 805, 807 irrespective of the other viewers on the user interface 800. Each viewer 801, 803, 805, 807 can also be configured such that its display is synchronized with that of the other viewers. For example, the display of gemstone 811 in viewer 801 can be synchronized with the display of gemstone 813 in viewer 803 such that the gemstones 811 and 813 are displayed having the same perspective. When a synchronized view is desired, only a single tool bar 819 with a pan forward button, a pan backward button, and a pause/play button may be displayed to control the display in all viewers.

In general, the detailed description of embodiments of the present technology is not intended to be exhaustive or to limit the present technology to the precise form disclosed above. While specific embodiments of, and examples for, the present technology are described above for illustrative purposes, various equivalent modifications are possible within the scope of the present technology, as those skilled in the relevant art will recognize. For example, while processes (or steps) or blocks are presented in a certain order, alternative embodiments can perform routines having steps, or employ systems having blocks, in a different order, and some processes or blocks can be deleted, moved, added, subdivided, combined, and/or modified. Each of these processes or blocks may be implemented in a variety of different ways. Also, while processes or blocks are at times shown as being performed in series, these processes or blocks may instead be performed in parallel, or can be performed at different times.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed. Rather, the phrase allows a meaning that includes at least one of any one of the items, and/or at least one of any combination of the items, and/or at least one of each of the items. By way of example, the phrases "at least one of A, B or C" refers to only A, only B, or only C; any combination of A, B and C; and/or at least one of each of A, B, and C.

The teachings of the present technology provided herein can be applied to other systems, not necessarily the system described herein. For example, while the various embodiments are described above with respect to display of search results of gemstones, those embodiments can be implemented for display search results of other unique items such as used cars, art, as well as other less unique items, such as consumer electronics, clothing/shoes, etc. The elements and acts of the various embodiments described herein can be combined to provide further embodiments.

We claim:

1. At least one non-transitory computer-readable medium carrying instructions that, when executed by a computing system, cause the computing system to generate a rotational view of a gemstone in a user interface by performing operations comprising:
  receiving, from a user, a selection of a gemstone to be displayed in a user interface;
  displaying, at the user interface, an initial image of the gemstone at a first angular perspective;
  receiving a pan command from the user, wherein the pan command specifies an initial direction of rotation of the displayed gemstone;
  receiving, by the computing system, a first dataset including first images of the gemstone, wherein each of the first images represents the gemstone at a different angular perspective around an axis of rotation compared to other first images, and wherein the perspectives of the first images are spaced apart around the axis of rotation compared to other first images;
  generating a display queue with the first images, wherein an order of the first images in the display queue is determined based on a proximity of angular perspective of a next first image to be displayed compared to a previous first image in the display queue;
  before receiving the entirety of a second dataset including second images of the gemstone, progressively displaying at least some of the first images at the user interface, according to the generated display queue, in order of increasing or decreasing angular perspective based on the received pan command, thereby causing the displayed gemstone to rotate in the specified initial direction of rotation;
  receiving, by the computing system, the second dataset including the second images of the gemstone, wherein each of the second images represents the gemstone at a different angular perspective around the axis of rotation compared to the first images and other second images, and wherein the angular perspectives of the second images are spaced apart around the axis of rotation compared to the other second images;
  modifying the display queue to incorporate the second images based on a proximity of angular perspective of a next second image to be displayed compared to a previous first or second image in the display queue; and
  progressively displaying the first images and the second images at the user interface, according to the modified display queue, in order of increasing or decreasing angular perspective based on the received pan command, thereby causing the displayed gemstone to continue to rotate in the specified initial direction of rotation.

2. The at least one non-transitory computer-readable medium of claim 1, wherein the user interface is displayed on a touchscreen, and the pan command is specified by detecting a user touch on the touchscreen at a first point and a drag left or right on the touchscreen to a second point.

3. The at least one non-transitory computer-readable medium of claim 2, wherein the dragging left or right on the touchscreen further specifies a desired magnitude of rotation.

4. The at least one non-transitory computer-readable medium of claim 1, wherein the pan command is specified by detecting a cursor movement of the user towards a left side of the user interface or to a right side of the user interface.

5. The at least one non-transitory computer-readable medium of claim 4, wherein the cursor movement to the left or right side of the user interface further specifies a desired magnitude of rotation.

6. The at least one non-transitory computer-readable medium of claim 1, wherein the pan command is a selection of a pan button.

7. The at least one non-transitory computer-readable medium of claim 6, wherein the pan command further specifies a desired magnitude of rotation.

8. The at least one non-transitory computer-readable medium of claim 7, wherein the magnitude of rotation determines a speed of rotation.

9. The at least one non-transitory computer-readable medium of claim 1, wherein the first and second images are interleaved.

10. A method performed by a computing system of generating a rotational view of a gemstone in a user interface comprising:
  receiving, from a user, a selection of a gemstone to be displayed in a user interface;

displaying, at the user interface, an initial image of the gemstone at a first angular perspective;

receiving a pan command from the user, wherein the pan command specifies an initial direction of rotation of the displayed gemstone;

receiving, by the computing system, a first dataset including first images of the gemstone, wherein each of the first images represents the gemstone at a different angular perspective around an axis of rotation compared to other first images, and wherein the perspectives of the first images are spaced apart around the axis of rotation compared to other first images;

generating a display queue with the first images, wherein an order of the first images in the display queue is determined based on a proximity of angular perspective of a next first image to be displayed compared to a previous first image in the display queue;

before receiving the entirety of a second dataset including second images of the gemstone, progressively displaying at least some of the first images at the user interface, according to the generated display queue, in order of increasing or decreasing angular perspective based on the received pan command, thereby causing the displayed gemstone to rotate in the specified initial direction of rotation;

receiving, by the computing system, the second dataset including the second images of the gemstone, wherein each of the second images represents the gemstone at a different angular perspective around the axis of rotation compared to the first images and other second images, and wherein the angular perspectives of the second images are spaced apart around the axis of rotation compared to the other second images;

modifying the display queue to incorporate the second images based on a proximity of angular perspective of a next second image to be displayed compared to a previous first or second image in the display queue; and progressively displaying the first images and the second images at the user interface, according to the modified display queue, in order of increasing or decreasing angular perspective based on the received pan command, thereby causing the displayed gemstone to continue to rotate in the specified initial direction of rotation.

11. The method of claim 10, wherein the user interface is displayed on a touchscreen, and the pan command is specified by detecting a user touch on the touchscreen at a first point and a drag left or right on the touchscreen to a second point.

12. The method of claim 11, wherein the dragging left or right on the touchscreen further specifies a desired magnitude of rotation.

13. The method of claim 10, wherein the pan command is specified by detecting a cursor movement of the user towards a left side of the user interface or to a right side of the user interface.

14. The method of claim 13, wherein the cursor movement to the left or right side of the user interface further specifies a desired magnitude of rotation.

15. The method of claim 10, wherein the pan command is a selection of a pan button.

16. The method of claim 15, wherein the pan command further specifies a desired magnitude of rotation.

17. The method of claim 16, wherein the magnitude of rotation determines a speed of rotation.

18. The method of claim 10, wherein the first and second images are interleaved.

\* \* \* \* \*